(12) United States Patent
Thomas (10) Patent No.: US 6,784,566 B2
(45) Date of Patent: Aug. 31, 2004

(54) COUPLED VORTEX VERTICAL AXIS WIND TURBINE

(76) Inventor: Robert Nason Thomas, 80 Lincoln Dr., Ventura, CA (US) 93001

( * ) Notice: Subject to any disclaimer, the term of this patent is extended or adjusted under 35 U.S.C. 154(b) by 0 days.

(21) Appl. No.: 10/056,946

(22) Filed: Jan. 25, 2002

(65) Prior Publication Data

US 2002/0105190 A1 Aug. 8, 2002

Related U.S. Application Data

(60) Provisional application No. 60/264,220, filed on Jan. 25, 2001.

(51) Int. Cl.$^7$ ............................................. F03D 9/00
(52) U.S. Cl. ........................... 290/55; 290/44; 415/60; 416/122
(58) Field of Search ..................... 290/55, 44; 415/60; 416/122

(56) References Cited

U.S. PATENT DOCUMENTS

| | | | | |
|---|---|---|---|---|
| 4,023,368 A | * | 5/1977 | Kelly | 60/698 |
| 4,074,951 A | * | 2/1978 | Hudson | 415/2.1 |
| 4,084,918 A | * | 4/1978 | Pavlecka | 415/1 |
| 4,088,419 A | * | 5/1978 | Hope et al. | 415/4.4 |
| 4,115,027 A | | 9/1978 | Thomas | 415/2 |
| 4,118,637 A | * | 10/1978 | Tackett | 290/55 |
| 4,156,580 A | * | 5/1979 | Pohl | 415/4.2 |
| 4,184,084 A | * | 1/1980 | Crehore | 290/55 |
| 4,221,538 A | * | 9/1980 | Wells | 415/7 |
| 4,236,083 A | * | 11/1980 | Kenney | 290/55 |
| 4,265,086 A | * | 5/1981 | Bahrenburg | 60/398 |
| 4,490,093 A | * | 12/1984 | Chertok et al. | 416/26 |
| 4,500,259 A | * | 2/1985 | Schumacher | 416/122 |
| 4,606,697 A | * | 8/1986 | Appel | 415/4.4 |
| 4,764,683 A | * | 8/1988 | Coombes | 290/55 |
| 4,830,570 A | * | 5/1989 | Benesh | 415/4.4 |
| 4,960,363 A | * | 10/1990 | Bergstein | 415/3.1 |
| 5,057,696 A | | 10/1991 | Thomas | 290/44 |
| 5,332,925 A | | 7/1994 | Thomas | 290/44 |
| 5,495,128 A | * | 2/1996 | Brammeier | 290/55 |

FOREIGN PATENT DOCUMENTS

| | | | | |
|---|---|---|---|---|
| CA | 2299154 A1 | * | 8/2001 | ............ F03D/3/02 |
| DE | 2758447 A1 | * | 7/1979 | |
| DE | 3126043 A1 | * | 1/1983 | ............ F03D/3/02 |
| EP | 46122 A2 | * | 2/1982 | ............ F03D/3/06 |

OTHER PUBLICATIONS

What are Vertical–Axis Wind Turbine (VAWTs)?, Eric Eggleston and AWEA Staff, date unknown, downloaded from Internet at http://www.awea.org/faq/vawt.html.
Technical Brief: Wind for Electricity Generation, ITDG, date unknown, downloaded from http://www.itdg.org/html/technical_enquiries/docs/wind_electricity_.pdf.

* cited by examiner

*Primary Examiner*—Joseph Waks
(74) *Attorney, Agent, or Firm*—John Vanden Bosche (57) ABSTRACT

A pair of vertical axis wind turbines are arranged in close proximity to each other so that their vortices interact with each other to provide enhanced aerodynamic efficiency. The wind turbines are spaced as closely as possible while providing for machine and personnel safety. Adjacent wind turbines rotate in opposite directions to enhance the coupled vortex effect. The vertical axis wind turbines may be located underneath a row of horizontal axis turbines in a "bush-tree" configuration to provide greater energy extraction from a parcel of land.

The vertical axis turbine includes a simple, redundant, fail-safe braking system that self-resets after a fault condition clears. The braking system includes mechanical and aerodynamic braking and also includes a speed governor that stops the wind turbine even in the event that the primary brake fails.

20 Claims, 10 Drawing Sheets

COUPLED VORTEX VERTICAL AXIS WIND TURBINE

RELATED APPLICATIONS

This application claims priority under 35 U.S.C. §119(e) to U.S. Provisional Patent Application No. 60/264,220 which was filed on Jan. 25, 2001.

FIELD OF THE INVENTION

The invention relates to the field of wind turbine generators and specifically to wind turbines that rotate about a vertical axis.

BACKGROUND OF THE INVENTION

Vertical axis wind turbines have been known for many years. The most common design for a vertical axis turbine is the Darrius turbine that uses curved blades in a troposkien shape. Other vertical axis turbines use straight blades that are attached to a vertical shaft with one or more blade support arms.

Modern vertical axis turbines use airfoils that provide lift rather than using aerodynamic drag to provide motive force to the rotor. The use of lift-producing airfoils increases the aerodynamic efficiency of the rotor greatly compared to a drag-type device. However, even with lift-producing airfoils, conventional vertical axis turbines suffer several disadvantages compared with horizontal axis turbines. The peak aerodynamic efficiency that most vertical axis wind turbines achieve is approximately 25–30%. Also, vertical axis wind turbines are not inherently self-starting and require the use of a starting motor to allow them to begin turning. Several improvements to the basic vertical axis wind turbine design have attempted to solve the inherent problems.

U.S. Pat. No. 4,115,027, the Specification of which is incorporated herein by reference, discloses a vertical axis, lift type windmill. Vertical airfoils that provide aerodynamic lift are mounted with struts around a central shaft to form a rotor.

U.S. Pat. Nos. 5,057,696 and 5,332,925, the Specifications of which are incorporated herein by reference, disclosed various improvements to the windmill of U.S. Pat. No. 4,115,027. The improvements included a new braking system, the use of thick airfoils, a drive belt transmission, two speed operation, and rotatable stators that improve efficiency and limit structural loads during high winds.

The wind turbines in all of the above-referenced patents utilize stationary fairings on the outside of the rotor to direct wind flow through the rotor and increase efficiency. While this approach has been found to significantly improve the performance of the wind turbine (aerodynamic efficiency has been measured as high as 52%), it also results in additional structure that must be supported and it adds planform area which increases the wind loading on the structure during storm conditions. It would be desirable to achieve similar performance improvements without the need for structural elements such as stationary fairings.

The wind turbines of the above referenced patents also utilize a mechanical braking system that has been found to be very reliable but which also requires a manual reset after activation. This can lead to high turbine downtime and low availability if an operator is not present on site full time. It would be desirable to incorporate a braking system that engages automatically when a fault occurs in the turbine system and that resets automatically and returns the turbine to service after a fault condition has been cleared.

It would be desirable to provide a vertical axis wind turbine that achieves high aerodynamic efficiency while requiring minimal support structure. It would also be desirable to provide a vertical axis wind turbine that is suitable for use underneath an existing row of horizontal axis wind turbines in a "bush-tree" configuration in order to maximize energy production on a parcel of land. It would further be desirable to provide a vertical axis wind turbine that incorporates a robust and reliable automatic aerodynamic and mechanical braking system that self-resets after a fault is cleared. Further, it would be desirable to minimize maintenance frequency and difficulty by providing easy access to parts requiring more frequent attention such as the gearbox and generator. It would be desirable to structurally simplify the turbine even further by employing a guyed shaft structure or a combination of guyed and externally supported frame rather than employing an external support frame. An externally guyed structure would minimize the number of parts required. These structures can also provide a cleaner aerodynamic flow field to enhance the turbines' vortex effect. It would be further desirable to enhance the turbines' vortex effect and improve self-starting capabilities by employing a high solidity rotor.

SUMMARY OF THE INVENTION

The present invention provides a wind turbine with increased aerodynamic efficiency through vortex interaction between two adjacent wind turbines and by employing high solidity rotors. The vortex interaction is the result of close placement of adjacent turbines as well as their angular orientation relative to the direction of the prevailing energy winds. The adjacent turbines must also rotate in opposite directions in order to achieve the coupled vortex interaction.

The guyed shaft structure can be placed in close proximity in a row configuration by employing either a three or four cable support point configuration in a staggered configuration that provides cable-to-cable and cable-to-rotor clearance. The wind turbines can be arranged in a long row of coupled wind turbines with aerodynamic enhancements occurring throughout the row of turbines. The row of turbines should be oriented perpendicular to the prevailing energy wind direction. This orientation of turbines is particularly well suited to geographical areas with a strong prevailing wind direction and little directional variability.

The row of vortex coupled turbines can be located underneath a row of horizontal axis turbines. This "bush-tree" configuration maximizes the energy capture that can be derived from a parcel of land. It is also possible that the aerodynamic performance of the horizontal axis turbines could be improved because of the presence of the vertical axis turbines beneath them It is possible that the row of vertical axis turbines could provide a vertical mixing effect bringing higher energy flow into the horizontal axis wind turbines' flow field.

The turbine uses a pneumatic braking system that automatically releases and allows the turbine to resume operation after a fault condition has been cleared. The pneumatic brake is biased with a weight so that it is normally applied via the weight and released when a pneumatic cylinder is pressurized to lift the brake and the weight. A solenoid valve that is normally closed controls the pressure to the pneumatic cylinder. The valve is electrically activated. When electrical power is off, the valve opens to release pressure to the cylinder. When power returns, the valve closes and a compressor pressurizes the cylinder to lift the weight and release the brake. This assures that the brake will be applied to stop the turbine in the event of a loss of electrical power and that it will be released when power is restored. A toggle switch is provided to open the solenoid valve if power is not lost but if, for some reason, the generator cannot function.

A linkage couples the mechanical brake with a system to adjust the blade pitch. When the brakes are applied, the blades pitch 45 degrees to act as a drag brake. In this way, the turbine has redundant mechanical and aerodynamic braking for greater reliability.

Turbine parts that experience high wear and that require maintenance are located at ground level. The guyed shaft of the turbine is supported by a pair of bearings located at bottom of the shaft. The two bearings are vertically separated by approximately three feet. The uppermost of the two bearings is held in a fixed position and supports the static weight of the main shaft only. The lowermost bearing is free to slide horizontally allowing the guyed shaft to teeter. The lower bearing supports the weight of the blades and the vertical forces from aerodynamic drag on the rotor. The load on the upper bearing is low enough so that the bearing lasts the life of the turbine. The lower bearing is located where it can be easily removed for cartridge replacement. The lower bearing support is free to move horizontally by employing a simple frame of ball bearings.

In the preferred embodiment of the present invention, the turbine includes three sets of blades in three stacked modules. Only the blades in the lowermost module are pitched during braking operations. The bottom set of blades can easily be reached from ground level for maintenance access. It is expected that the pitchable set of blades will require higher maintenance than the other two fixed-pitch sets of blades due to pitching movement during braking. The wear level on the blades is not expected to be high because braking should be a relatively infrequent occurrence. The two upper modules employ blades that are attached with a yoke type attachment with a durable pin connection that restrains the blades from pitching motion and minimizes wear.

The bearing atop the guyed shaft is enclosed within a cable attachment housing and isolated from environmental exposure. This is expected to reduce greasing requirements and minimize wear.

BRIEF DESCRIPTION OF THE DRAWINGS

Other features and advantages of the invention will be apparent from the following Detailed Description taken in conjunction with the accompanying drawings, in which.

DETAILED DESCRIPTION OF THE INVENTION

Figure 1:
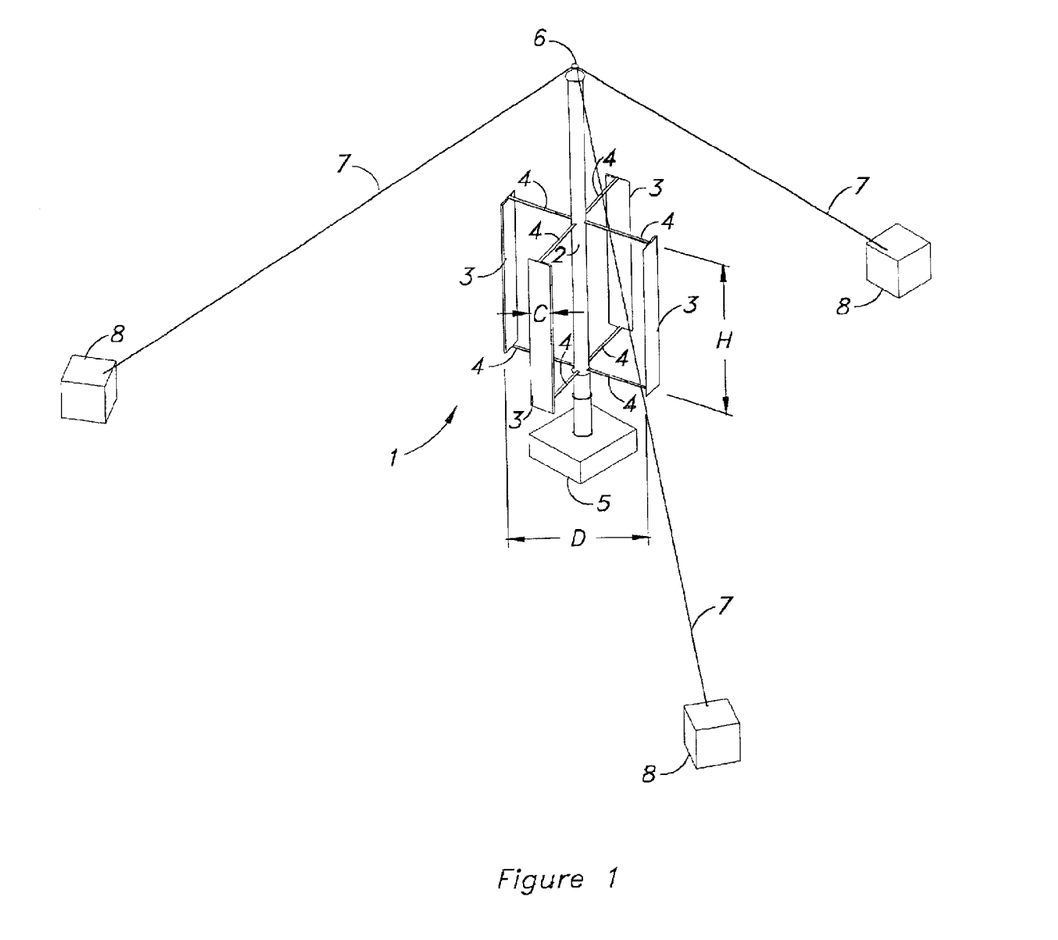
FIG. 1 is a perspective view of the guyed vertical axis wind turbine according to the present invention.

As shown in FIG. 1, the present invention consists of a wind turbine 1 which has a main shaft 2 which rotates about a vertical axis. The main shaft 2 is preferably made from steel pipe of sufficient diameter and thickness to withstand compressive, torque and bending loads both during turbine operation and during high winds in which the turbine would be stopped. Attached to the main shaft 2 are four blades 3. The number of blades could change as a design choice although the chord length or rotor diameter would need to change to maintain the desired solidity. Four blades is the preferred embodiment. Each blade 3 is attached to the main shaft 2 with a pair of blade arms 4. The preferred embodiment is to use two blade arms 4 for each blade 3, although it is conceivable to use a single blade arm 4 for each blade 3. It is also preferred that the blade arms 4 be freely attached to each blade 3 at the ends of the blade 3 in order to reduce aerodynamic tip effects on the blades and to avoid blade 3 bending stress at the blade arm 4 attachment point. It is preferred that the blade 3 be attached to the arm 4 with a moment free connection, such as a pinned connection.

The height of the rotor H is defined by the length of the blades 3. The diameter of the rotor D is defined by two times the distance from the shaft 2 centerline to the blade 3 chord line. The total swept area of the rotor is defined as the rotor height H times the rotor diameter D. Each blade 3 has a planform area that is defined by the blade's chord width C times the length of the blade H. The total blade planform area is four times the planform area for an individual blade because there are four blades in the rotor. The total blade planform area divided by the rotor area is known as the rotor solidity. For the case of the present invention, the rotor solidity is preferably 33%. For drag type windmill rotors, the solidity would be much higher than 33% and is often 100%. Experimentation has shown that rotor solidity in the range of 30% to 40% provides optimum performance and a solidity of 33% is preferred.

The main shaft 2 is supported at its lower end in a drive train housing 5 and at its upper end by a bearing 6. The upper bearing is supported by a set of guy cables 7. The main shaft 2 extends above the top set of blade arms 4 by a distance that is greater than the length of a blade arm 4 so that the guy cables 7 can be extended at a 45 degree angle to foundations 8 that are buried in the ground. FIG. 1 shows a configuration with three guy cables, although it would be possible to use four or more guy cables if desired depending on site soil conditions, topography, and other factors.

Figure 2:
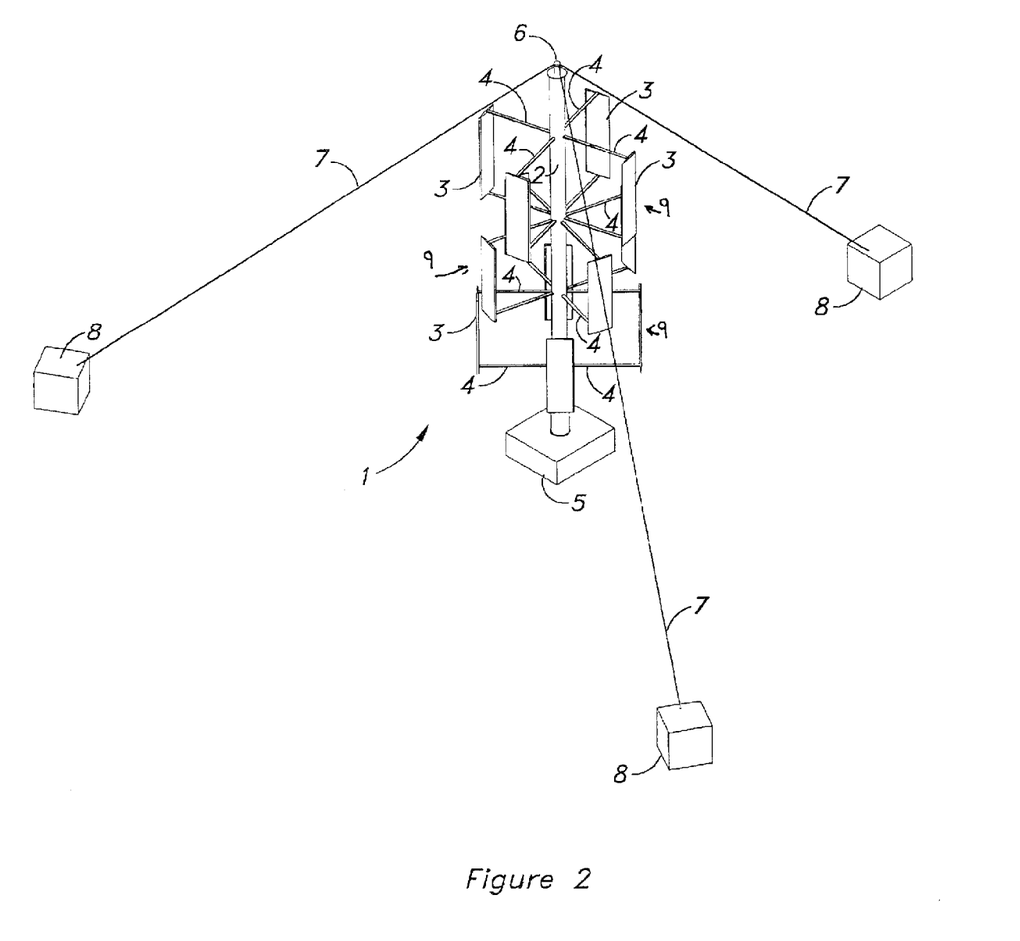
FIG. 2 is a perspective view of a second preferred embodiment of the present invention.

FIG. 2 shows a second preferred embodiment of the invention in which the rotor includes three modules 9 stacked one above another. Each module includes four blades 3 attached to a main shaft 2 via blade arms 4. Each module 9 in the second preferred embodiment is similar to the rotor of the first preferred embodiment. The solidity of each rotor module 9 is between 30% to 40% and is preferably 33%. The three modules 9 shown in FIG. 2 are all connected to a common main shaft 2 so that they rotate together. The blades 3 of the three modules 9 are staggered by 30 degrees between modules. By staggering the blades, the output of the wind turbine is smoothed. While three modules are shown in FIG. 2, it would be possible to include two modules or it would be conceivable to include four or more modules.

Figure 3:
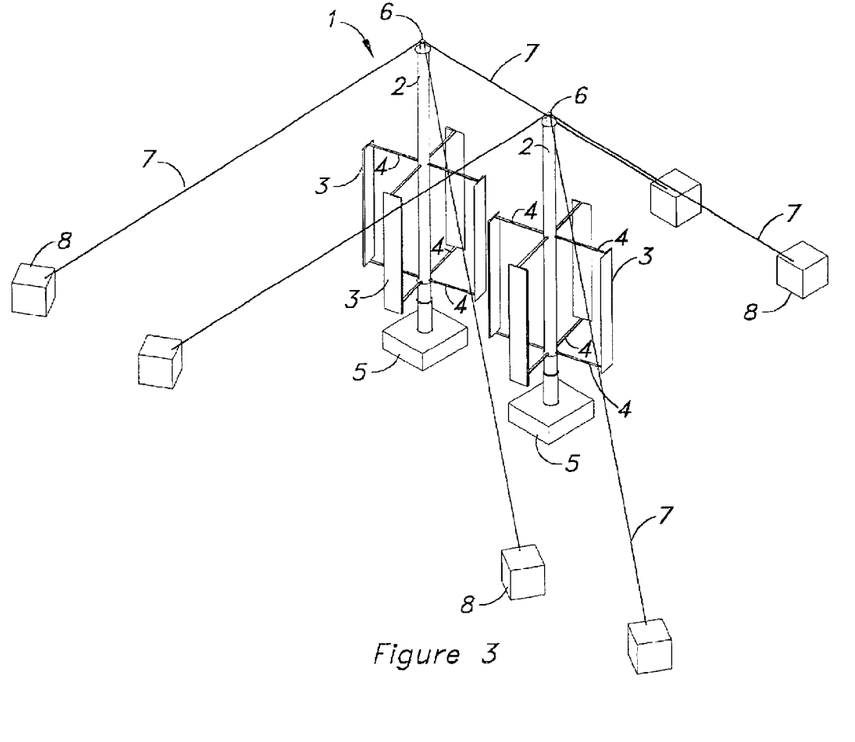
FIG. 3 is a perspective view of two wind turbines according to the present invention arranged in a coupled vortex configuration.
Figure 4:
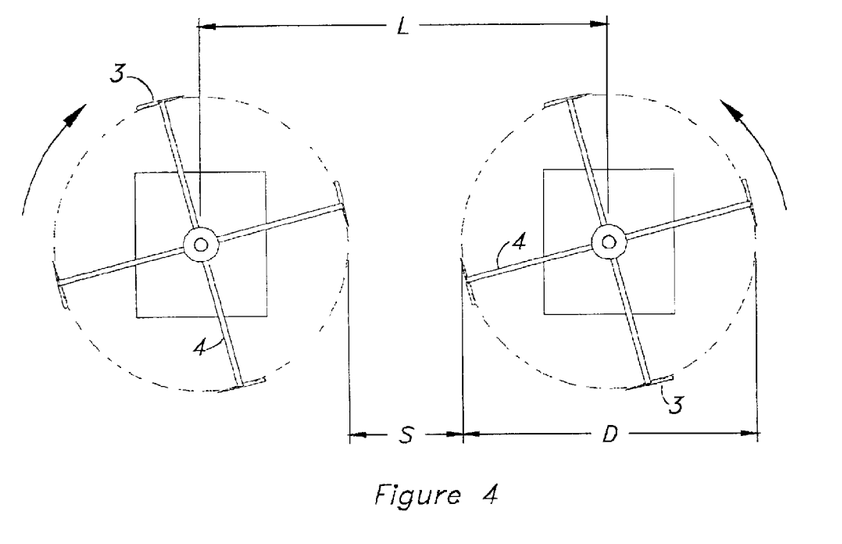
FIG. 4 is a schematic top view of a pair of vertical axis wind turbines according to the present invention arranged in a coupled vortex configuration.

If two wind turbines 1 are placed in close proximity to each other, as shown in FIG. 3, the combination of linear flow and vortex flow from the two rotors combines such that the efficiency of both rotors is increased. FIG. 4 shows the two wind turbines in plan view where it can be seen that the turbines with rotor diameter D have their centerlines spaced apart by a distance L. If L is slightly larger than D, then the rotors will be spaced apart from each other by a distance s which is equal to L minus D. The separation s between the two rotors should be kept as small as possible while allowing for appropriate machine and personnel safety. A separation of approximately three feet is preferred. This close placement of adjacent rotors is referred to as the coupled vortex arrangement. In the coupled vortex arrangement, the two rotors should rotate in opposite directions in order to achieve the desired increase in aerodynamic efficiency. The directions of rotation for the two rotors is depicted by the arrows in FIG. 4.

The wind turbines in the coupled vortex arrangement should be oriented so that the line connecting the centerlines of the two wind turbines is perpendicular to the prevailing energy wind direction. Ideally the wind direction should not vary by more than 20 degrees relative to the direction shown in FIG. 4. At sites with a strong prevailing wind direction, such as is found in mountain passes, this may be possible to achieve. However at sites without a dominant prevailing wind direction, the coupled vortex arrangement for the rotors may not work as well.

Figure 5:
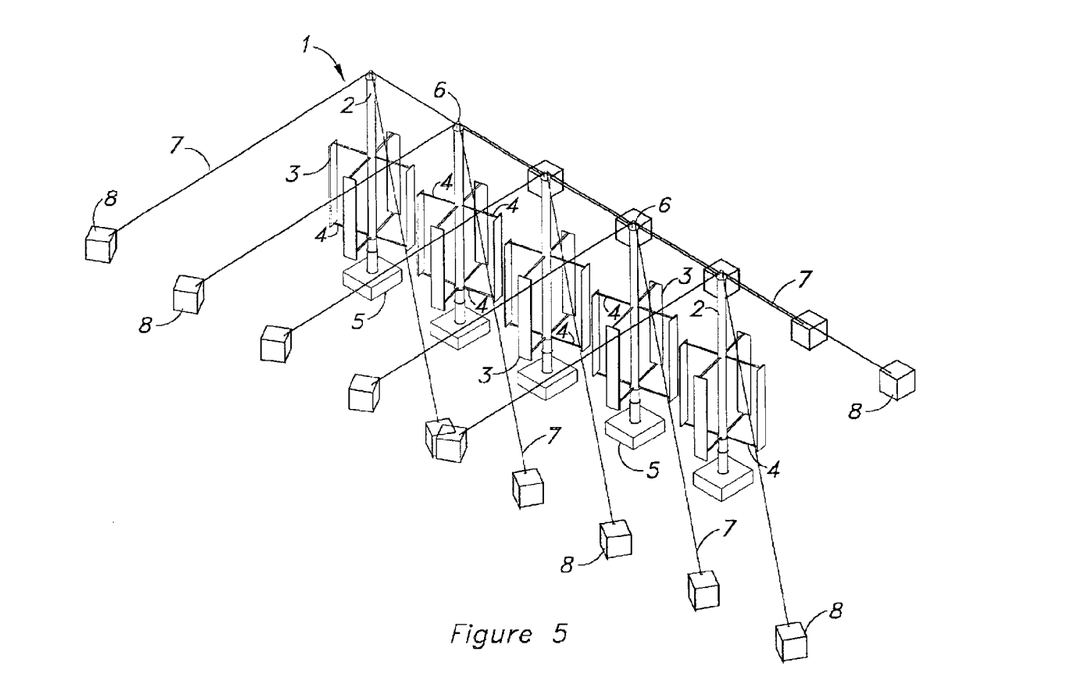
FIG. 5 is a perspective view of a plurality of vertical axis wind turbines according to the present invention arranged in a row in a coupled vortex configuration.
Figure 6:
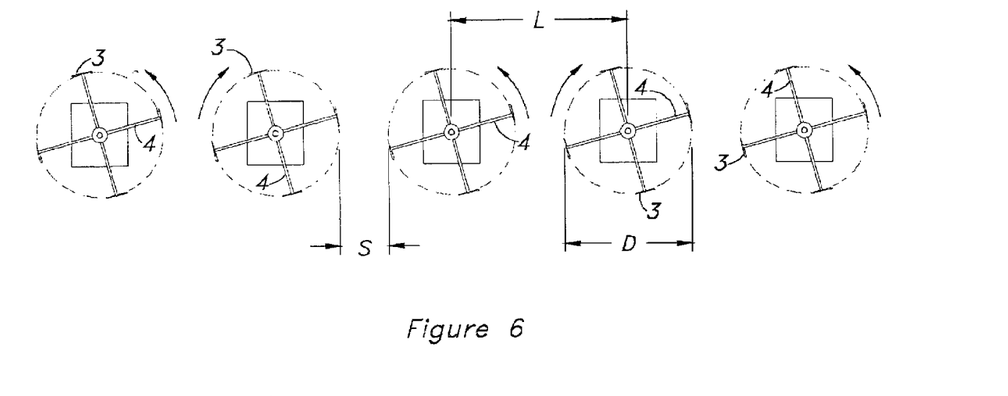
FIG. 6 is a schematic top view of a plurality of vertical axis wind turbines according to the present invention arranged in a row in a coupled vortex configuration.

As shown in FIG. 5 a longer row of wind turbines can be arranged in the coupled vortex arrangement. When a long row of wind turbines is so arranged, the centerline of each rotor is separated from the centerline of the adjacent rotors by a distance L which is only slightly larger than the rotor diameter D so that there is a small separation s between each pair of rotors. As shown in FIG. 6, each rotor should turn in the opposite direction to its neighboring turbines, In this way, every second turbine will turn clockwise as viewed from the top while the turbines in between will turn counter-clockwise as viewed from the top.

Figure 7:
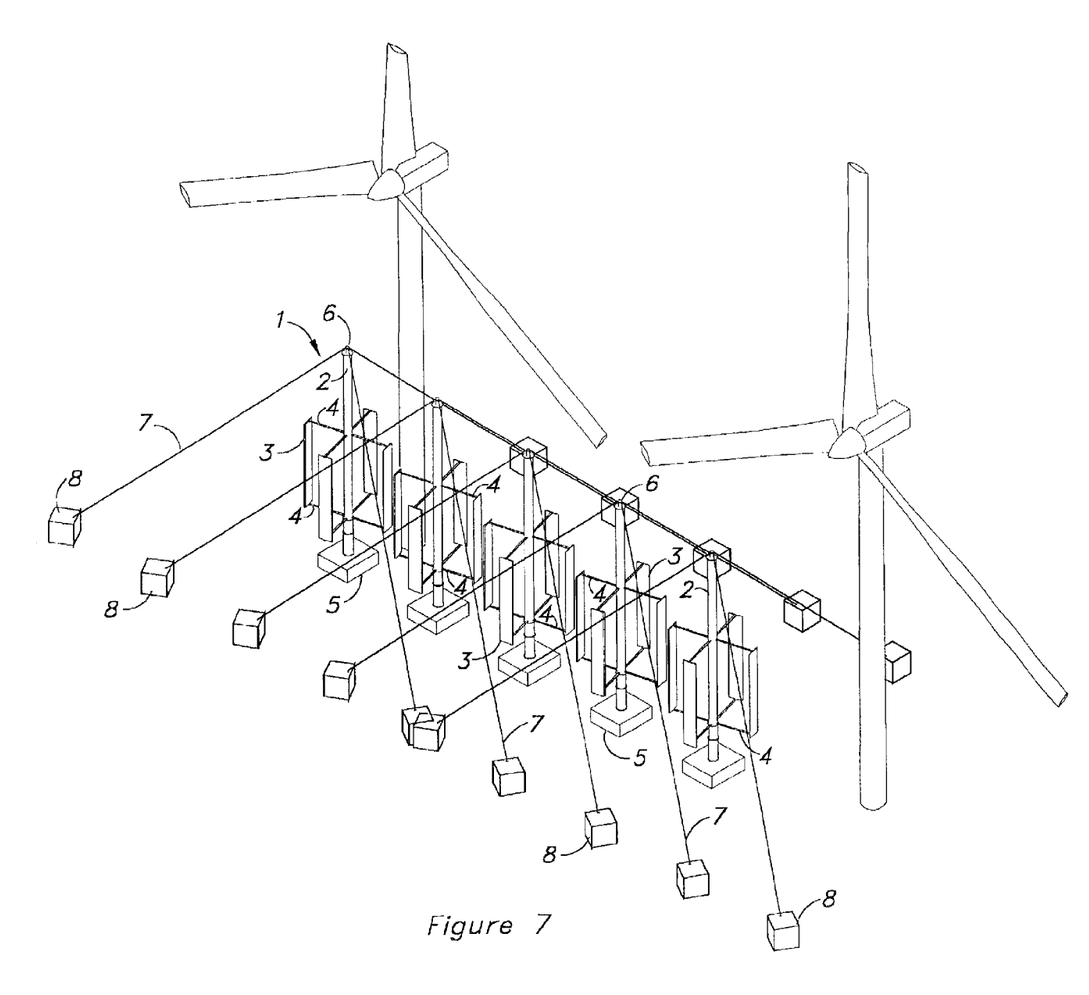
FIG. 7 is a perspective view of a row of vertical axis wind turbines arranged in a coupled vortex configuration along with a row of horizontal axis wind turbines in a bush-tree configuration.

As shown in FIG. 7, the row of wind turbines could be located underneath a row of horizontal axis wind turbines to form a "bush-tree" configuration. This allows greater energy extraction from a parcel of land. It may also increase the performance of the horizontal axis wind turbines by vertical mixing or replacing lower energy air at lower levels with higher energy air from above. Another possible synergy of the bush-tree arrangement is that the foundations for the horizontal axis turbines could be modified to serve as anchor points for the guy wires that support the vertical axis wind turbines in the coupled vortex row. This configuration is particularly well-suited to sites with unidirectional prevailing winds.

The drive train for the wind turbine of the present invention is similar to that described in U.S. Pat. Nos. 5,057,696 or 5,332,925, both of which are incorporated herein by reference. As shown schematically in FIG. 8, the drive train consists of a shaft mounted gearbox 10 that increases the rotational speed of the main shaft 2 to a speed that is useful for driving a generator. A belt drive 11 transfers power from the gearbox 10 to a generator 12. The belt drive 11 may provide additional speed increase and it also introduces some flexibility into the drive train to smooth out torque spikes. The gearbox 10 is a shaft mounted type that unless restrained will rotate in the direction of torque. In the preferred embodiment, the gearbox 10 is constrained to a small angular increment of rotation so that belt tension varies from loose (without falling off) to tight. This angular increment is adjustable. A shock absorber 13 constrains the rate of angular rotation of the gearbox 10 in the positive torque direction stabilizing the drive train during start up and damping torque spikes. A standard light truck shock absorber is employed in the preferred embodiment.

Figure 8:
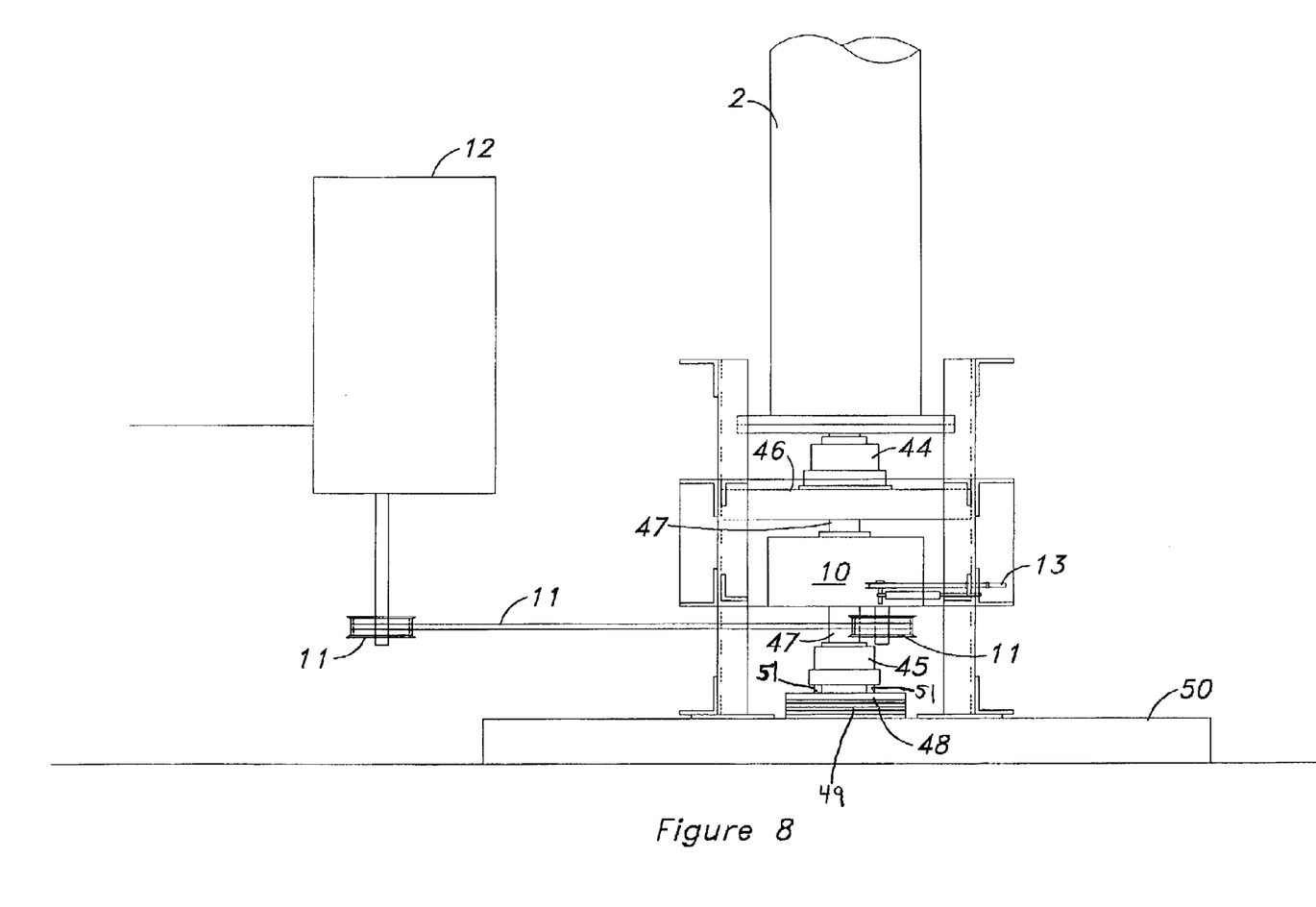
FIG. 8 is a schematic elevation view of a drive train and generator arrangement according to the present invention.

It is possible that the belt drive 11 could be eliminated from the drive train, although the preferred embodiment includes the belt drive. The generator 12 is a standard asynchronous induction generator in the preferred embodiment. Other types of generators or alternators could be used that operate at constant or at variable speeds.

Figure 9:
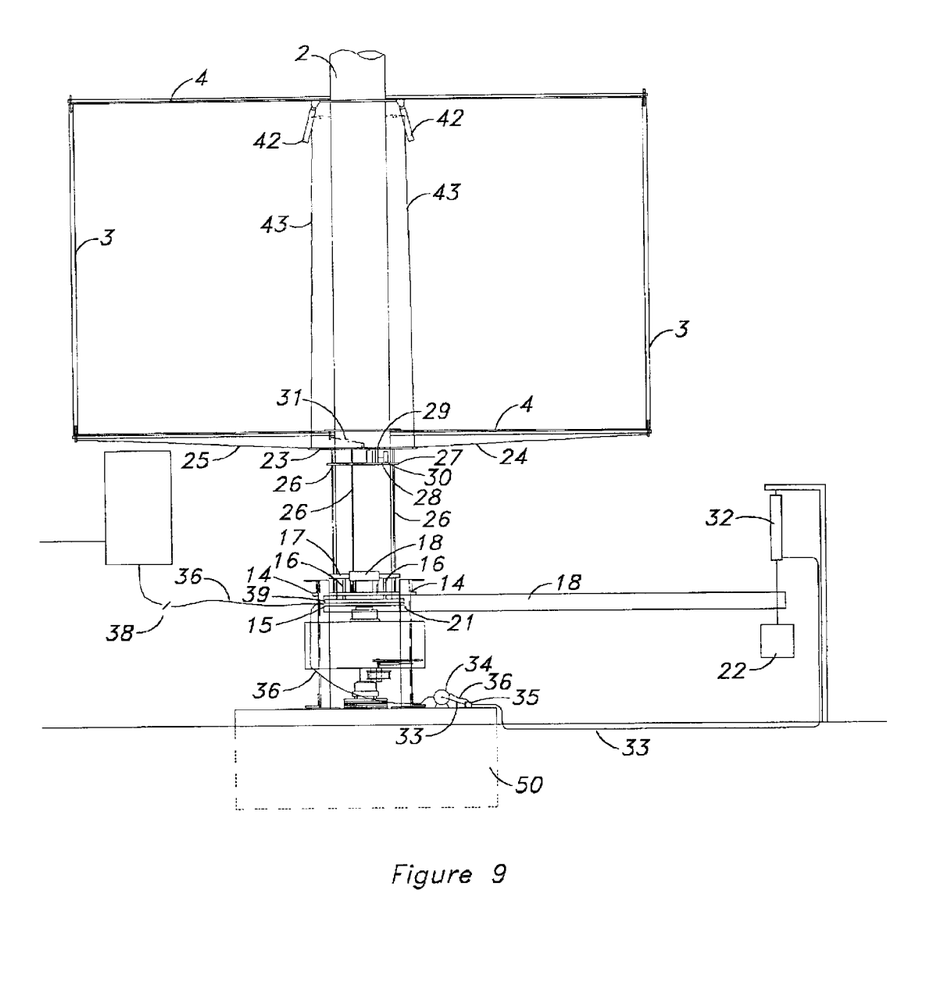
FIG. 9 is a schematic elevation view of a brake and blade actuation arrangement according to the present invention.
Figure 10:
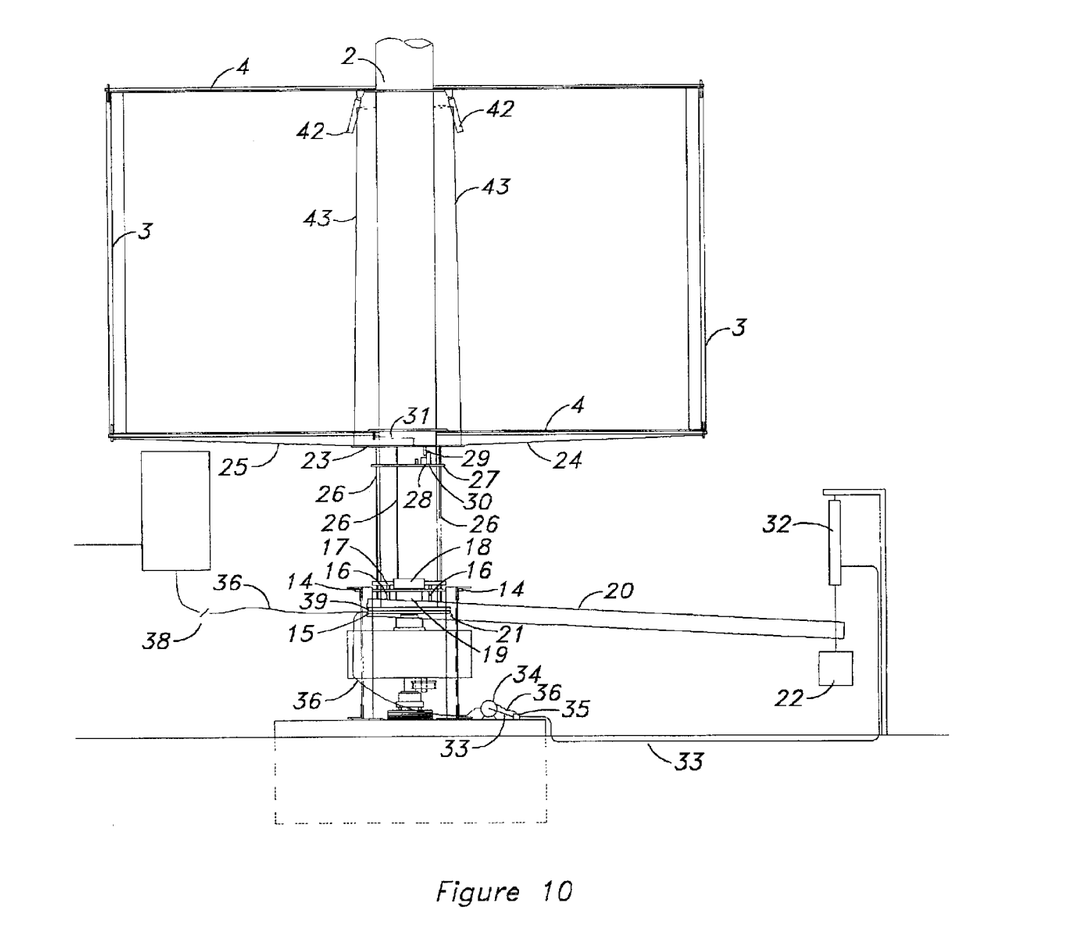
FIG. 10 is a schematic elevation view of the brake and blade actuation arrangement according to the present invention with the brakes engaged.

The braking system for the wind turbine, shown schematically in FIGS. 9 and 10 is a critical component. The brake system is shown in FIG. 9 in a released position in which the turbine can operate. FIG. 10 shows the brake system in an engaged position for stopping the turbine. The wind turbine's braking system must ensure that the wind turbine does not run away to damaging speeds in the event that the electrical grid is lost or that the generator or its controls malfunction and the generator is no longer capable of limiting the speed of the wind turbine rotor. The braking system must also be capable of bringing the wind turbine to a stop in a short period of time in the event of a fault or other problem with the wind turbine.

As shown in FIGS. 9 and 10, the brake system consists of a brake disc 14 that is located above a bottom flange 15 of the main shaft 2. The inside diameter of the brake disc 14 is slightly larger than the outside diameter of the main shaft 2 allowing the disc 12 to both rotate and move up or down. The disc 14 is restrained in rotational motion relative to the main shaft 2 by several pins 16 that fit vertically through the bottom flange 15, the brake disc 14 and a flange 17 identical to the bottom flange 15. Flanges 15 and 17 are welded to the main shaft 2 and their outside diameters (which are equal in size) are much smaller than the outside diameter of the brake disc 14. The brake disc 14 is free to move vertically between flanges 15 and 17. There are two sets of brake shoes, an upper fixed set of shoes 18 and a lower moveable set of shoes 19. The moveable shoes 19 are free to move vertically and to pivot in a vertical plane. The moveable shoes 19 are mounted on the short end of a brake arm 20 that pivots in the vertical plane on fulcrum pin shafts 21. A weight 22 is provided on the end of the brake arm 20 to provide braking force. The fulcrum pin 21 is placed such that the distance from it to the end of the brake arm 20 supporting the weight 22 is ten times the distance from the pin 21 to the center of the moveable brake shoes 19. There are two parallel brake arms 20 mounted one on each side of the main shaft 2. When the long end of the brake arm 20 is lowered about the fulcrum 21 the short end rises displacing the moveable shoes 19 upward. The moveable shoes 19 are located below the brake disc 14 and contact the disc 14 when the shoes 19 are raised. With further lowering of the long end of the brake arms 20 the brake disc 14 is raised until it comes in contact with the upper fixed brake shoes 18. The disc 14 is then sandwiched between the upper and lower brake shoes 18 and 19. This position is shown in FIG. 10. The braking force is then the weight 22 times the mechanical advantage of the leverage or ten times the weight 22.

In addition to the mechanical braking force of the brake shoes 18 and 19 on the brake disk 14, the wind turbine also includes a system for pitching the blades 3 to provide aerodynamic braking. The aerodynamic braking system includes a blade activation disk 23 that is located on the main shaft 2 at a height near the bottom set of blade arms 4. The inner diameter of the blade activation disk 23 is slightly larger than the outer diameter of the main shaft 2 so that the disk 23 can rotate around the main shaft and move up and down along the shaft 2. Attached to the blade activation disk are a set of blade pitch cables 24 and 25. The first set of cables 24 attach to the leading edge of a blade 3. The second set of cables 25 attach to the trailing edge of a blade 3. There are four of each type of cable 24 and 25 so that when the blade actuation disk 23 is rotated relative to the main shaft 2, the leading edges of the blades are moved away from the main shaft 2 and the trailing edges are moved toward the main shaft 2 to pitch the blades 3. The blades 3 are pivot mounted on the blade arms 4 at a position between the trailing edge of the blades and the blades' center of gravity. Because the center of gravity is forward of the pivot position, the blades tend to pitch unless they are restrained by cables 24.

The blade activation disk 23 is rotated at the same time that the mechanical brake is applied. A set of push rods 26 rest on the top of brake disk 14 and extend upward to the bottom side of blade activation disk 23. The push rods 26 are guided and restrained within holes in flange 17 and another flange 27 that is located just below the blade activation disk 23. The holes in flanges 17 and 27 are oversized to allow the push rods to move vertically through the holes. When the mechanical brake is applied, brake disk 14 is moved upward. The upward motion of brake disk 14 is transmitted through the push rods 26 to the blade activation disk 23 so that blade activation disk 23 is also moved upward. A first set of stops 28 restrains a detent 29 attached to the blade activation disk 23 against rotational movement relative to main shaft 2. However, when the push rods 26 move the blade activation disk 23 upward, the detent 29 on the blade activation disk 23 moves clear of the stops 28. Centrifugal force from the blades then pulls the cables 24 and 25, and therefore the blade activation disk 23, to a new position in which the detent 29 engages a second set of stops 30. The first set of stops 28 correspond to a blade pitch position for turbine operation and the second set of stops 30 correspond to a blade pitch position for aerodynamic braking. Ideally, the blades should pitch approximately 45 degrees between stops 28 and stops 30. A set of springs 31 pulls the blade activation disk 23 back to the operating position in which the detent 29 is engaged with stops 28. When the rotor speed slows, the centrifugal force from the blades is not high enough to overcome the force of the springs 31 and the blades return to their operating position. When the mechanical brake is released, the push rods 26 move downward and allow the detents 29 to fall into a position where they are retained by stops 28. In this way, the blades are pitched during a braking operation to provide aerodynamic braking, but they automatically return to their operating position when the brake is released. The aerodynamic brakes are shown in FIG. 9 in their operating position and in FIG. 10 in their stopping position with the blades pitched.

In the embodiment shown in FIG. 2 in which the wind turbine includes three stacked modules, the aerodynamic brake is preferably included on only the bottom module. The blades on the other two modules are fixed in pitch in order to minimize wear and maintenance on the upper modules.

Figure 11:
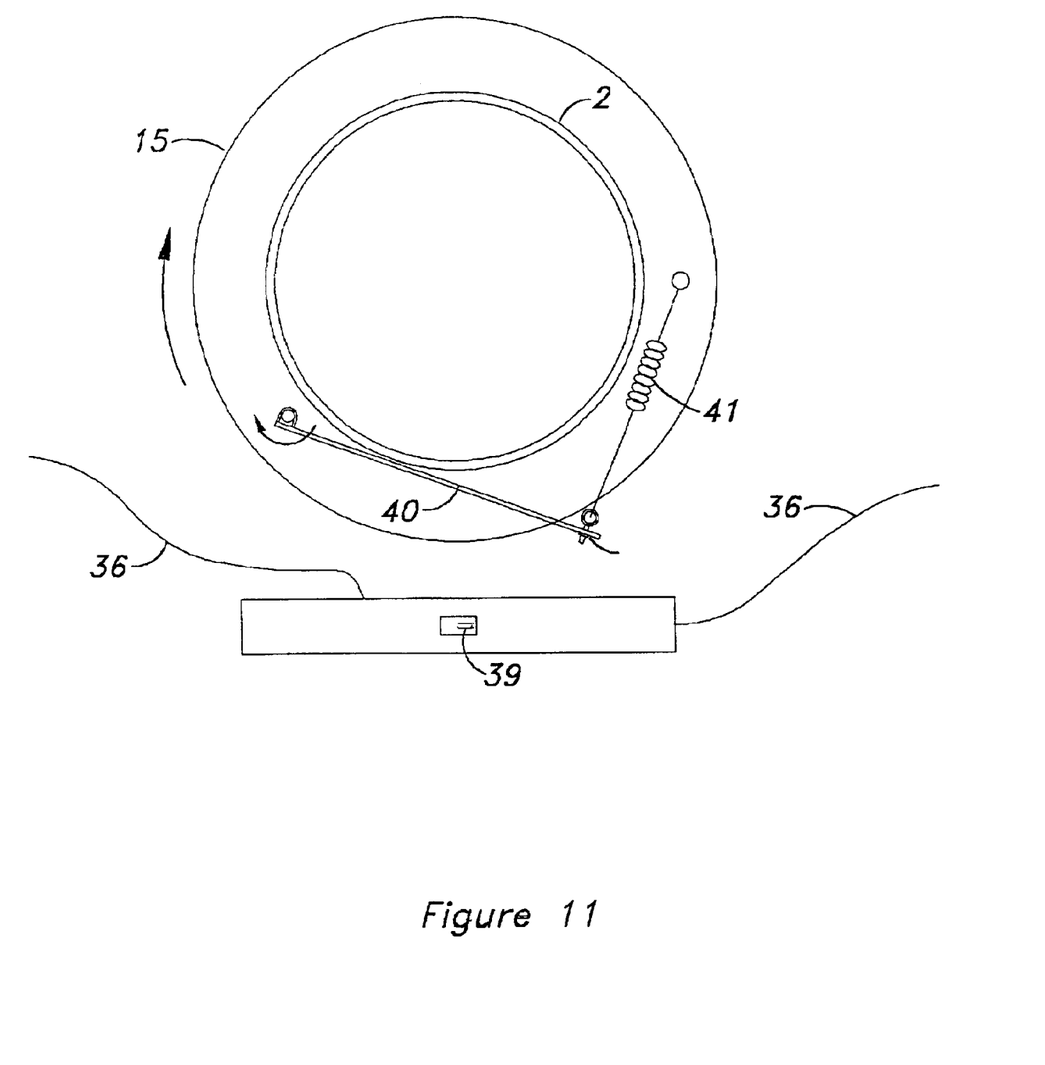
FIG. 11 is a plan view of a brake trip switch according to the present invention.

As shown in FIGS. 9 and 10, the brake system is actuated with a pneumatic cylinder 32 that raises and lowers the weight 22 and the end of the brake arms 20. When the lower end of the cylinder 32 is pressurized, the internal piston is forced upward lifting the weight 22 and the brake arms 20. The cylinder 30 must be pressurized to release the brake and the brake is applied when pressure in the cylinder is released. The pressurized air supply 33 to the cylinder 32 is controlled to control the brake system. An air compressor 34 supplies pressurized air to the cylinder 32. In the preferred embodiment one compressor 34 supplies compressed air for the air cylinders 32 on several adjacent wind turbines. Flow into and out of the air cylinder is controlled by a solenoid valve 35. The valve 35 is electrically energized by a circuit 36 that also provides power to the generator 12 so that the brake is activated if power to the generator 12 is disrupted. The compressed air line 33 is open between the cylinder 32 and the compressor 34. When electrical energy to the valve 33 is interrupted the valve 33 closes between the compressor 34 and the cylinder 32 and exhausts the pressurized air from the cylinder 32 causing the weight 22 and brake arms 20 to drop, engaging the brake system. This is a fail-safe design because loss of power will de-energize the solenoid valve 35 and release pressure in the air line 33 supplying the pneumatic cylinder 32 thereby causing the brake to be applied. Electrical energy to the valve 33 can be interrupted by a fault in the turbine circuit or the utility supply. It can also be interrupted by manually switching the solenoid 36 and compressor circuit 37 off with a brake switch 38. In addition to manual switching, a toggle switch 39 in the solenoid circuit 36 can be switched off by a trip arm 40 that moves into the path of the toggle switch 39 to turn it off. The trip arm 40 and toggle switch 39 are shown in FIG. 11. The manual switch 38 and toggle switch 39 must be manually reset or reset through control software. If there is a fault in the utility circuit, the brake will engage but will automatically disengage when electricity is restored.

As shown in FIG. 11, the toggle switch 39 is activated by a trip arm 40. The trip arm 40 is mounted on the main shaft flange 15. The trip arm 40 is free to rotate away from the main shaft 2 but is constrained by a spring 41. Spring 41 tension can be set so that the trip arm 40 moves into a position to trip the toggle switch 39 when the rotor speed is above an acceptable speed i.e. slightly greater than generation speed. The trip arm 40 is preferably steel to provide sufficient mass and therefore sufficient centrifugal force. In alternative embodiments, the switch 39 could be activated by solid state speed sensors or by a PLC controller.

Although the braking system includes redundant mechanical and aerodynamic braking, and although the activation system is fail-safe, experience with wind turbines has shown that it is desirable to include another redundant brake trip system in order to prevent runaway wind turbines. A redundant rotor speed governor system is shown in FIGS. 9 and 10. A set of weighted arms 42 are bearing mounted on the top blade arms 4 of the bottom rotor module. Two arms 42 are employed in the preferred embodiment. The arms 42 hang down when the rotor is at rest. When rotor speed increases the arms 42 fling up and out. A cable 43 is attached to each arm 42 at an appropriate distance from the arm pivot point and connects to the top of blade activation disk 23. When the rotor speed exceeds a speed above the toggle switch 39 trip speed, sufficient tension in cable 43 tension is developed to lift the disc 23 off its first set of stops 28. The blades 3 are then free to pitch to a 45 degree pitch angle. The aerodynamic braking effect keeps the rotor speed within a structurally safe range. This is a fail safe system of rotor protection.

The lower end of the main shaft 2 is supported by two bottom bearings 44 and 45 as shown in FIG. 8. The main bearing or upper bearing 44 is mounted to the main support cross beam 46 above the gearbox 10 and the foundation. The shaft system includes the main shaft 2 and a drive shaft 47. This shaft system can pivot about the main bearing 44. Both bearings are self aligning. The shaft system, including main shaft 2 and drive shaft 47, teeters because the guy cables 7 can stretch under load. The bottom bearing 45 must be able to move in the horizontal plane to relieve bending stresses in the drive shaft 47. Bearing 45 is smaller than the main bearing 44. The drive shaft is stepped at the bottom to accommodate bearing 45 and so that bearing 45 can share thrust loads with the main bearing 44. The lower bearing rests on plate 48 which rests on a roller bearing surface 49 shown in FIG. 12. The roller bearing surface 49 allows the bearing support plate 48 to move freely in the horizontal plane to relieve bending on the drive shaft 47. All of these plates are supported by the foundation 50 through several plates that are held in place horizontally by anchor bolts protruding from the foundation 50. The lower bearing 45 is therefore supported by the foundation 50. The lower bearing 43 rests on plate 48 by adjustable bearing bolts 51 that can be set to specific load sharing between the main bearing 44 and the lower bearing 45.

Figure 12:
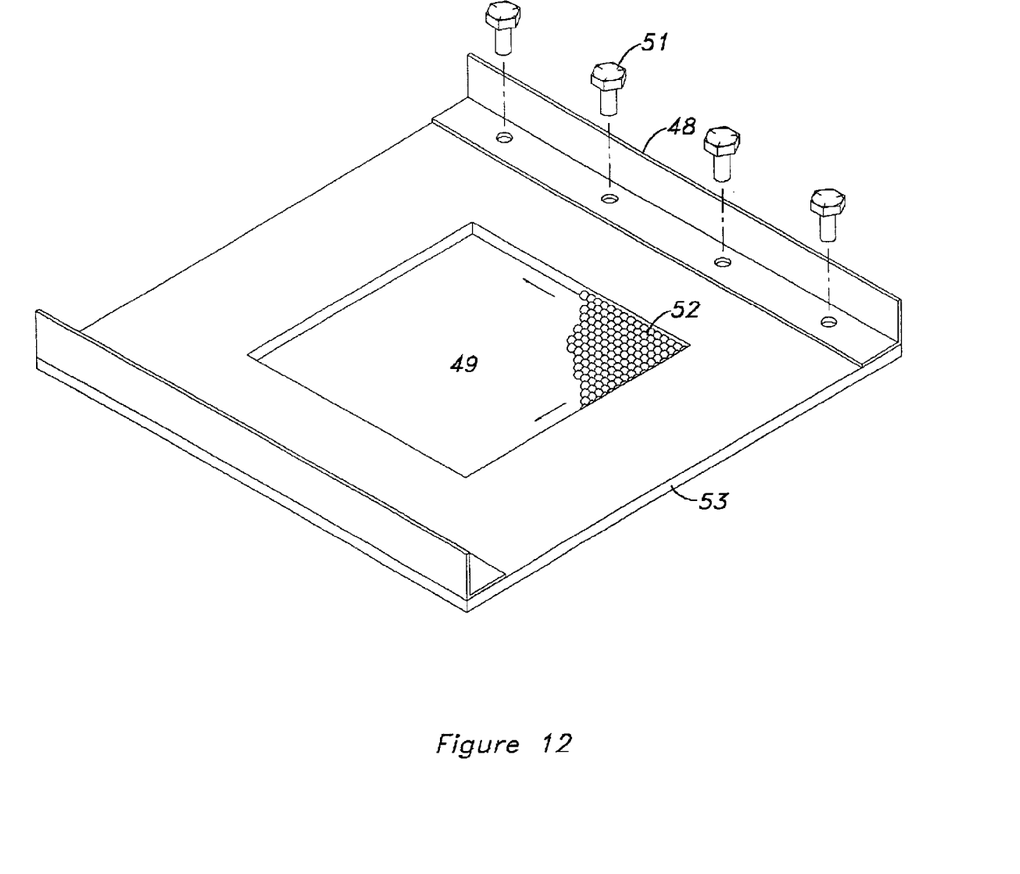
FIG. 12 is a perspective view of a roller bearing surface.

FIG. 10 shows that the roller bearing surface 49 is a surface formed by an array of ball bearings 52 held in place by a frame 53. All of the ball bearings 52 are of equal diameter. Ball bearing 52 diameter is greater than the frame 53 thickness so that the steel plates above the roller bearings 52 rest on the spherical bearings. The top bearing plate 48 can roll around on these bearings 52. The top 48 and bottom 51 plates are greased on the surfaces adjacent to the spherical bearings 52.

While preferred embodiments of the invention have been shown and described, it will be apparent to those skilled in the art that various modifications may be made in these embodiments without departing from the scope of the invention. Therefore, it is intended that the invention not be limited to the particular embodiments disclosed but that the scope of the invention be defined by the following claims.

I claim:

1. A pair of lift-based wind turbines wherein each wind turbine comprises:
    a shaft that rotates about a vertical axis, and
    a blade attached to said shaft for rotation therewith wherein said blade is spaced radially outward from said shaft by a predetermined radius,
    wherein the shafts of said pair of lift-based wind turbines are separated from each other by a distance that is less than three times said radius and greater than two times said radius, and wherein aerodynamic interaction between said wind turbines increases the efficiency thereof.

2. The wind turbines of claim 1 wherein said shaft of a first one of said wind turbines rotates in a first predetermined direction and said shaft of a second one of said wind turbines rotates in the opposite direction as said one of said wind turbines.

3. The wind turbines of claim 1 wherein said shafts of said pair of wind turbines are separated from each other by a distance that is greater than two times said radius but less than two times said radius plus ten feet.

4. The wind turbines of claim 3 wherein said shafts of said pair of wind turbines are separated from each other by a distance that is greater than two times said radius but less than two times said radius plus 5 feet.

5. The wind turbines of claim 3 wherein said shafts of said pair of wind turbines are separated from each other by a distance that substantially equal to two times said radius plus 3 feet.

6. The wind turbines of claim 1 wherein said wind turbines have a rotor solidity that is greater than 30% and less than 40%.

7. The wind turbines of claim 6 wherein said wind turbines have a rotor solidity that is substantially 33%.

8. The wind turbines of claim 1 wherein said wind turbines further comprise a fail-safe braking system.

9. The wind turbines of claim 8 wherein said braking system is self-resetting.

10. The wind turbine of claim 8 wherein said braking system includes a pneumatic actuator.

11. The wind turbine of claim 10 wherein a single air compressor provides compressed air for said pneumatic actuator for both wind turbines in said pair of wind turbines.

12. The wind turbines of claim 1 further comprising a third wind turbine wherein said third wind turbine comprises:
    a tower,
    a shaft that rotates about a substantially horizontal axis,
    a blade attached to said shaft for rotation therewith wherein the swept path of said blade defines a rotor with upper and lower extreme heights, and
    wherein said horizontal axis wind turbine is arranged adjacent said pair of vertical axis wind turbines such that said lower extreme height of said horizontal axis wind turbine is taller than the top of said vertical axis wind turbines.

13. The wind turbines of claim 1 wherein said wind turbines are installed at a location with a prevailing wind direction and wherein a line between the shafts of said pair of wind turbines is substantially perpendicular to said prevailing wind direction.

14. The wind turbines of claim 1 adapted to provide generally unobstructed flow of wind between the wind turbines.

15. A pair of lift-based wind turbines wherein each wind turbine comprises:
    a shaft that rotates about a vertical axis, and
    a blade attached to said shaft for rotation therewith wherein said blade is spaced radially outward from said shaft by a predetermined radius,
    wherein the shafts of said pair of lift-based wind turbines are separated from each other by a distance that is less than three times said radius, wherein said pair of lift-based wind turbines are adapted to provide generally unobstructed flow of wind between the wind turbines.

16. The wind turbines of claim 15 wherein said shaft of a first one of said wind turbines rotates in a first predetermined direction and said shaft of a second one of said wind turbines rotates in the opposite direction as said one of said wind turbines.

17. The wind turbines of claim 15 wherein said wind turbines are installed at a location with a prevailing wind direction and wherein a line between the shafts of said pair of wind turbines is substantially perpendicular to said prevailing wind direction.

18. The wind turbines of claim 15 further comprising a third wind turbine wherein said third wind turbine comprises:
    a tower,
    a shaft that rotates about a substantially horizontal axis,
    a blade attached to said shaft for rotation therewith wherein the swept path of said blade defines a rotor with upper and lower extreme heights, and
    wherein said horizontal axis wind turbine is arranged adjacent said pair of vertical axis wind turbines such that said lower extreme height of said horizontal axis wind turbine is taller than the top of said vertical axis wind turbines.

19. The wind turbines of claim 15 wherein said wind turbines further comprise a fail-safe braking system.

20. The wind turbines of claim 19 wherein said braking system is self-resetting.

* * * * *